(12) United States Patent
Krishnamurthy

(10) Patent No.: US 9,871,755 B2
(45) Date of Patent: Jan. 16, 2018

(54) ENCODING PORTIONS OF A MESSAGE

(71) Applicant: Facebook, Inc., Menlo Park, CA (US)

(72) Inventor: Rajiv Krishnamurthy, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/522,021

(22) Filed: Oct. 23, 2014

(65) Prior Publication Data
US 2016/0119266 A1    Apr. 28, 2016

(51) Int. Cl.
*G06F 17/00* (2006.01)
*H04L 12/58* (2006.01)
*H04L 29/08* (2006.01)
*H04W 4/14* (2009.01)

(52) U.S. Cl.
CPC ............ *H04L 51/18* (2013.01); *H04L 51/066* (2013.01); *H04L 67/32* (2013.01); *H04W 4/14* (2013.01)

(58) Field of Classification Search
CPC ....... H04L 51/18; H04L 67/32; H04L 51/066; H04L 67/03; H03M 7/30; H04Q 4/14
USPC .......................................... 235/375; 706/206
See application file for complete search history.

(56) References Cited

U.S. PATENT DOCUMENTS

| | | | | |
|---|---|---|---|---|
| 6,100,824 A | * | 8/2000 | MacLeod | H03M 7/3088 341/106 |
| 9,087,038 B1 | * | 7/2015 | Haldar | H04W 4/18 |
| 2008/0037509 A1 | * | 2/2008 | Foti | H04L 29/06027 370/349 |
| 2010/0169441 A1 | * | 7/2010 | Lafleur | G06F 17/276 709/206 |
| 2012/0296983 A1 | * | 11/2012 | Boehm | H03M 7/3088 709/206 |
| 2013/0173248 A1 | * | 7/2013 | Curzi | H03M 7/6088 704/9 |
| 2013/0253908 A1 | * | 9/2013 | Zhai | G06F 17/276 704/9 |
| 2013/0262486 A1 | * | 10/2013 | O'Dell | G06F 17/2735 707/755 |
| 2014/0278407 A1 | * | 9/2014 | Chelba | G10L 15/197 704/235 |

* cited by examiner

*Primary Examiner* — Laura Gudorf
(74) *Attorney, Agent, or Firm* — Perkins Coie LLP

(57) ABSTRACT

The disclosure is related to encoding a message or portions of the message to be exchanged between a pair of users. Messages can be exchanged between a pair of users in multiple ways, e.g., electronic mail, short messaging service (SMS), messenger applications. The computing resource, e.g., network bandwidth consumed in transmission of the messages, can be minimized by encoding/compressing at least portions of a message prior to transmission. A server analyzes messages exchanged between a pair of users to identify message portions, e.g., a word or a phrase, that are commonly exchanged and generates a set of codes for those message portions. The pair of users can use the set of codes for encoding and/or decoding the messages exchanged between them. The codes are generated using a specified coding technique, e.g., Huffman coding.

20 Claims, 12 Drawing Sheets

205

First User: Honey!
Second User: I love you
First User: I love you
First User: take care
...
First User: Hi Honey!
Second User: Whats up?
First User: What time are you heading home?
Second User: on my way!...
Second User: Very soon...
First User: I love you ...
Second User: I love you too
First User: We have to go shopping...
Second User: you won't believe what happened today
First User: what
First User: what
Second User: I learnt to make coffee
....
Second User: Hey Honey
First User: Hi Honey!
Second User: why aren't you home yet ...
First User: Boss is keeping me busy... LOL
Second User: ask him to let you go ...
First User: It's a she...
First User: I love you
First User: take care

FIG. 2B

etc. "Instant messaging" is a popular social networking application for communicating quickly and conveniently using messages. The computing resource, e.g., network bandwidth consumed by the messages, can be minimized by encoding and/or compressing a message or portions of the message prior to transmission. In some embodiments, a sender and a receiver use a common coding scheme for encoding and decoding messages. The coding scheme can be based on a specified coding technique, e.g., Huffman coding, that generates a set of codes for a set of message portions, e.g., a word or a phrase, that the sender and the receiver commonly exchange. The set of codes form a code dictionary, which the sender and the receiver can use for encoding and/or decoding the messages exchanged between them. The message is compressed/encoded, prior to transmission, by the sender by replacing the message portions that appear in the code dictionary with the corresponding codes, and decompressed/decoded by the receiver, upon receipt of the message, by replacing the codes with message portions to which the codes correspond.

ENCODING PORTIONS OF A MESSAGE

BACKGROUND

Some applications, e.g., messaging applications, can consume a significant amount of computing resources, e.g., network bandwidth, for transmitting data across a network. Due to the size of the data transmitted and a limited bandwidth, users may experience a delay in receiving the data. This delay can cause inconvenience, especially in messaging applications where users exchange messages very frequently and expect to receive the messages in near real time. Further, since some types of data are exchanged frequently and consume bandwidth, the amount of bandwidth available to transmit other types of data may be very limited. This can cause an overall delay in the network and may render the communication network less usable.

Some applications using encoding techniques to encode data transmitted over the Internet. The encoding techniques are of various types and are for various purposes, e.g., security, conserving storage space, faster transmission, etc. However, these encoding techniques are highly complex to implement and consume significant computing resources for encoding and/or decoding.

BRIEF DESCRIPTION OF THE DRAWINGS

FIG. 2B illustrates an example of a portion of the log of FIG. 2A including some of the messages exchanged between a first user and a second user, consistent with various embodiments.

DETAILED DESCRIPTION

Figure 1:
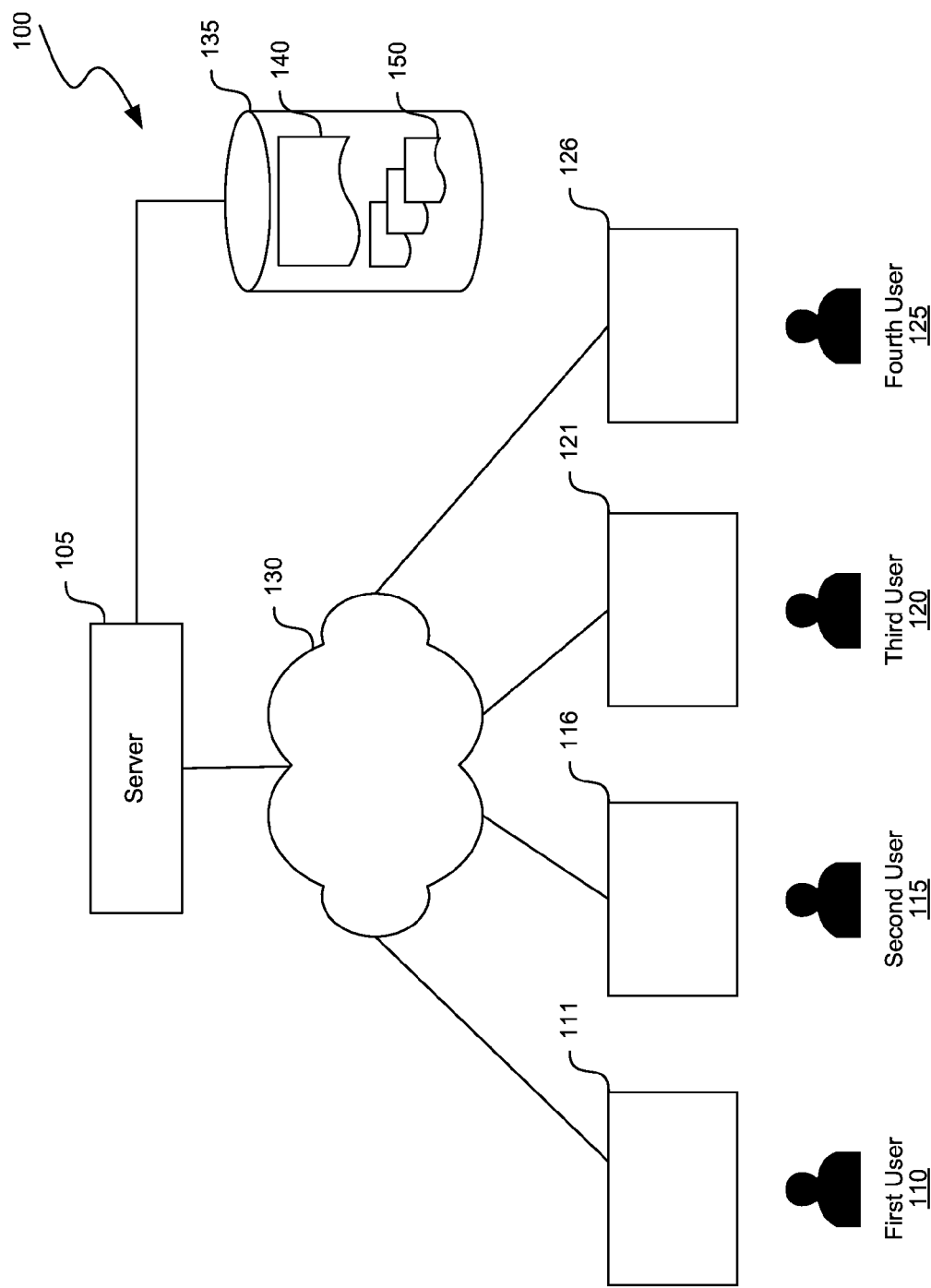
FIG. 1 is a block diagram illustrating an environment in which encoding of messages can be implemented.

Disclosed are embodiments directed to encoding a message or portions of the message to be exchanged between pairs (or other groups) of users. Messages can be exchanged between a pair of users in multiple ways, e.g., electronic mail, short messaging service (SMS), messenger applica- In some embodiments, to generate the set of codes, the messages that the sender and the receiver commonly exchange may have to be monitored and analyzed to determine the commonly exchanged messages or message portions. In some embodiments, a server computing device ("server") that facilitates the exchange of messages between a pair of users, e.g., a first user and a second user, and maintains a history of the messages exchanged between the pair of users. The server analyzes the messages from the history and identifies a set of message portions based on an encoding criterion, e.g., frequency of occurrence, probability of occurrence in future messages, etc. The identified set of message portions is then encoded based on one or more specified coding techniques to generate corresponding codes. In some embodiments, the coding technique is Huffman coding and the codes can be a series of bits. For example, the word "Honey" can be encoded as "0010." The codes can be of variable bit-length or a fixed bit-length.

After the codes are generated for pairs of users, the server generates a code dictionary containing the codes and the message portions to which they correspond, and transmits the code dictionary to each of the pair of the users for whom the code dictionary was generated. The code dictionaries are stored at client computing devices ("clients") associated with the users and can also be stored at the servers associated with social networking system. The pair of the users uses the code dictionary received from the server to encode/decode the messages that is exchanged between each other. In some embodiments, the code dictionary is unique for the pair of users.

Each of the pair of users can use the code dictionary for sending and/or receiving messages from one another. For example, consider an exchange of a first message in which the first user intends to send a message to the second user. The first user composes the message on a first client associated with the first user; the first client can analyze the composed message to determine if the composed message has any message portions that match message portions in the code dictionary stored on the first client. The first client replaces any of the matching message portions with their corresponding codes to generate an encoded message, and transmits the encoded message to a second client associate with the second user. The second client does the opposite to output the received message. For example, the second client receives the encoded message, retrieves codes from the encoded message, performs a look up in the code dictionary to retrieve the message portions to which the codes correspond, replaces the codes with the message portions and outputs the decoded message to the second user, e.g., outputs the message on a display of the second client.

Note that while encoding a message for transmission to a recipient only message portions that have a corresponding code may be replaced with the code and other message portions that do not have a code may be sent as is, that is, without encoding.

Environment

FIG. 1 is a block diagram illustrating an environment 100 in which encoding of messages can be implemented. The environment 100 includes a server 105 that facilitates multiple users, e.g., a first user 110, a second user 115, a third user 120 and a fourth user 125, to exchange messages with one another. The messages can be of any number of types, e.g., email, SMS, text message, and can include multimedia content, e.g., text, emoticons, audio clips, video clips, images, stickers. In some embodiments, some of the media types, e.g., text, emoticons, stickers can be encoded using the disclosed embodiments. The users may send and/or receive messages using their associated computing devices, e.g., a first client 111, a second client 116, a third computing device 121 and a fourth computing device 126. A computing device can be any of a number of device types, e.g., a smartphone, a laptop, a desktop, a tablet computer, a wearable computing device, an in-automobile computing device, or any other computing device that is capable of sending and/or receiving messages.

In some embodiments, the server 105 includes a messenger application, executing on the server 105 to facilitate the users to exchange messages. A portion of the messenger application can also execute on the computing devices of the users. For example, if the messenger application is implemented as an "app," the app executes on the computing device and another portion of the app, e.g., a server portion, executes on the server 105. The server 105 stores various data at a storage system 135. In some embodiments, the data includes user profile data of the users, a log 140 containing chat history of the users, multiple code dictionary objects 150.

The computing devices 111-126 can communicate with the server 105 over various types of communication networks. For example, they may communicate with the server 105 over a communication network 130, e.g., Internet, Intranet, local area network (LAN), and a wide area network (WAN).

A user, e.g., the first user 110, can exchange messages with any of the users who are in the user's contact list, e.g., any of the second user 115, the third user 120 and the fourth user 125. In some embodiments, the contact list can be an address book of the user on the computing device associated with the user. The server 105 stores the messages exchanged between the users in the log 140. For example, the messages exchanged between the first user 110 and the second user 115 can be stored in the log 140. In some embodiments, the server 105 appends any of the messages exchanged between the first user 110 and the second user 115 to the log 140 as and when the server 105 receives messages from either of the users. The server 105 can store messages between different pairs of users in different logs or a common log. In some embodiments, the server 105 stores conversations between different pairs of users in different logs. In some embodiments, the server 105 stores conversations of a particular user with the other users in one log.

As described above, the server 105 generates codes for certain message portions and shares the codes with the users to encode and/or decode the messages, e.g., to minimize network bandwidth consumed in exchanging the messages. The codes generated can be unique for a pair of users or common among more than a pair of users. In some embodiments, the codes are unique for a pair of users. For example, the server 105 can generate a set of codes for certain message portions that occurred or likely to occur in the messages exchanged between the first user 110 and the second user 115. The server 105 shares the set of codes with the first user 110 and the second user 115, who can then use the codes to encode and/or decode the messages. In some embodiments, the codes are common among more than a pair of users. For example, if the users are employees of an organization or members of a particular team in the organization, the server 105 can generate a set of codes for certain message portions that occurred or likely to occur in the messages exchanged between any of the users. The server 105 shares the set of codes with all the users, who can then use the codes to encode and/or decode the messages exchanged between any of the users.

The server 105 stores the generated codes in one or more code dictionary objects, e.g., code dictionary objects 150, which are then shared with the users. The server 105 can generate a code dictionary object per pair of users or per more than a pair of users. In some embodiments, a code dictionary object contains codes generated per pair of users, which contains the set of codes to be used by the pair of the users for encoding and/or decoding the messages exchanged between them. In some embodiments, a code dictionary object contains codes that are generated for more than a pair of users, e.g., for members of a team in an organization or for employees of an organization. The code dictionary objects 150 are stored in the storage system.

The following paragraphs discuss details with respect to generating codes for message portions that occur or likely to occur to between a pair of users in association with at least FIGS. 2A-2D.

Figure 2A:
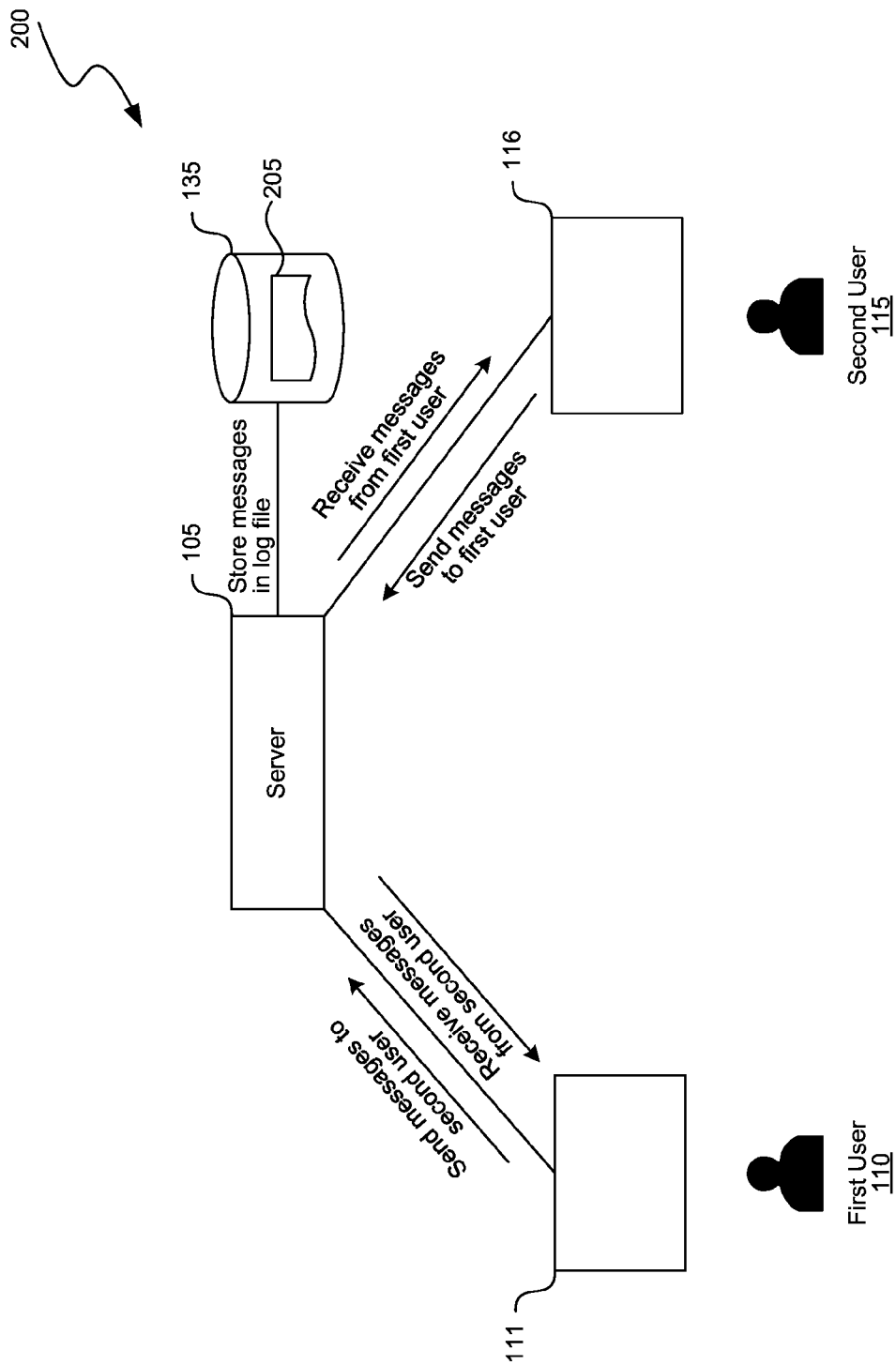
FIG. 2A is a block diagram illustrating a pair of users exchanging messages, consistent with various embodiments.

FIG. 2A is a block diagram illustrating a pair of users exchanging messages, consistent with various embodiments. The first user 110 and the second user 115 exchange messages between each other, e.g., using a messenger application executing on their computing devices 111 and 116, respectively. The message exchanged between them can include various types of content, e.g., text, emoticons, stickers, audio, video. The server 105 facilitates the exchange of messages between the users. The server 105 stores the messages exchanged between the users in a log, e.g., log 205, at the storage system 135. In some embodiments, the log 205 can be similar to the log 140 of FIG. 1. FIG. 2B illustrates an example of a portion of the log 205 including some of the messages exchanged between the first user 110 and the second user 115, consistent with various embodiments.

Figure 2C:
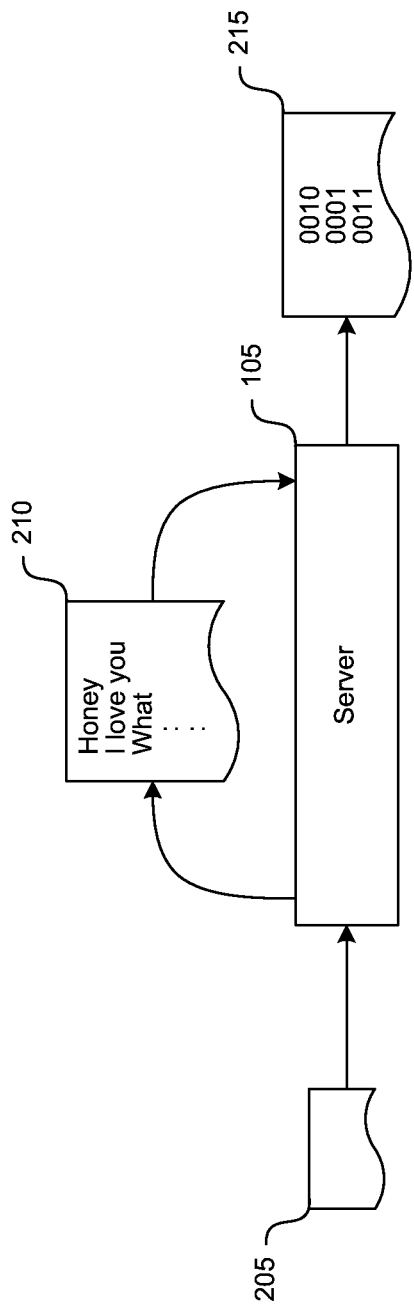
FIG. 2C is a block diagram for generating the codes for message portions of a log file, consistent with various embodiments.

FIG. 2C is a block diagram for generating the codes for message portions in the log 205, consistent with various embodiments. The server 105 analyzes the log 205 to identify a set of message portions 210 for which the codes can be generated. The server 105 identifies the set of message portions 210 based on various encoding criteria, e.g., a frequency of occurrence, a probability of occurrence. For example, the server 105 can identify the words whose number of occurrences exceeds a specified threshold. Further, the frequency of occurrence can be defined in various degrees. For example, the frequency of occurrence can be a number of times a word or a phrase occurs in messages exchanged in a single conversation, a day, or over a specified period. In some embodiments, a conversation can be defined as messages exchanged in a particular session, which has a begin time—time at which a first message of the conversation was exchanged, and an end time—time when the last message of the conversation was exchanged.

A user, e.g., an administrator of the server 105, can define the encoding criteria and the thresholds for identifying the message portions for encoding. For example, in FIG. 2C, if the administrator has set an encoding criterion to encode the message portions whose frequency of occurrence is "3" or more, then the server 105 identifies the words "Honey," "What" and a phrase "I love you," all of which have occurred more than "3" times, as the set of message portions 210. After identifying the set of message portions 210, the server 105 encodes each message portion in the set of message portions 210 to generate the codes 215. The server 105 encodes the set of message portions 210 using any of various encoding techniques.

In some embodiments, the server 105 uses an encoding technique, e.g., Huffman encoding and generates the codes 215 as Huffman codes. In some embodiments, a Huffman code is an optimal prefix code found for a code word using Huffman coding. In some embodiments, a prefix code is a type of code system (typically a variable-length code) distinguished by its possession of the "prefix property"; which states that there is no valid code word in the system that is a prefix (start) of any other valid code word in the set. In other words, a prefix coding generates a set of codes such that no code in the set of codes is a prefix of another code in the set. For example, a code with code words {9, 55} has the prefix property since neither the code "9" nor the code "55" is a prefix of any other code in the set. A code consisting of {9, 5, 59, 55} does not have the prefix property because the code "5" is also a prefix of both "59" and "55". A prefix code is an example of a uniquely decodable code: a receiver can identify each word without requiring a special marker between words.

Huffman coding is a common technique used in entropy encoding, including in lossless data compression. The algorithm's output can be viewed as a variable-length code table for encoding a source symbol (such as a character in a file). Huffman's algorithm derives this table based on the estimated probability or frequency of occurrence (weight) for each possible value of the source symbol. As in other entropy encoding methods, more common symbols are generally represented using fewer bits than less common symbols.

Referring back to the set of codes 215, the server 105 can generate codes for the words "Honey," "What" and a phrase "I love you." The codes can be of fixed-length or variable length bits. In some embodiments, the codes 215 are of variable-length. For example, the code for "honey" can be "0010," "what" can be "0011," "I love you" can be "001."

The code generated may be case specific or may be independent of the case of characters in a word or a phrase that is encoded. In some embodiments, a code generated for a word or a phrase is not case specific, e.g., the server 105 does not consider the case of a letter in the word or the phrase for generating the code. For example, the server 105 can generate a single code, "0010" for the word "Honey," "honey," "HONEY" etc. When a sender sends a message with any of these words, the word can be replaced with the code "0010." In some embodiments, a code generated for a word or a phrase is case specific. For example, the server 105 can generate different codes for the words "Honey," "honey," "HONEY" etc.

In some embodiments, the server 105 generates codes for variations of a message portion that is in the set of message portions 210. The variations can be various forms of the commonly occurring word or phrase that can also be commonly used by the users in their conversations. For example, the variations of "Honey" can be "Honey!" "hi! Honey," "hey honey!" etc. The server 105 can generate a code for each of these variations of the word "Honey."

In some embodiments, the server 105 generates codes for message portions that are likely to occur because of the occurrence of a particular message portion of the set of message portions 210 in the conversations between the first user 110 and the second user 115. For example, if the server 105 determines that the phrase "I love you" has occurred a specified number of times, then it can determine that the likelihood/probability of occurrence of the phrase "I love you too" in future messages can be high. The server 105 can then generate a code for the phrase "I love you too".

Figure 2D:
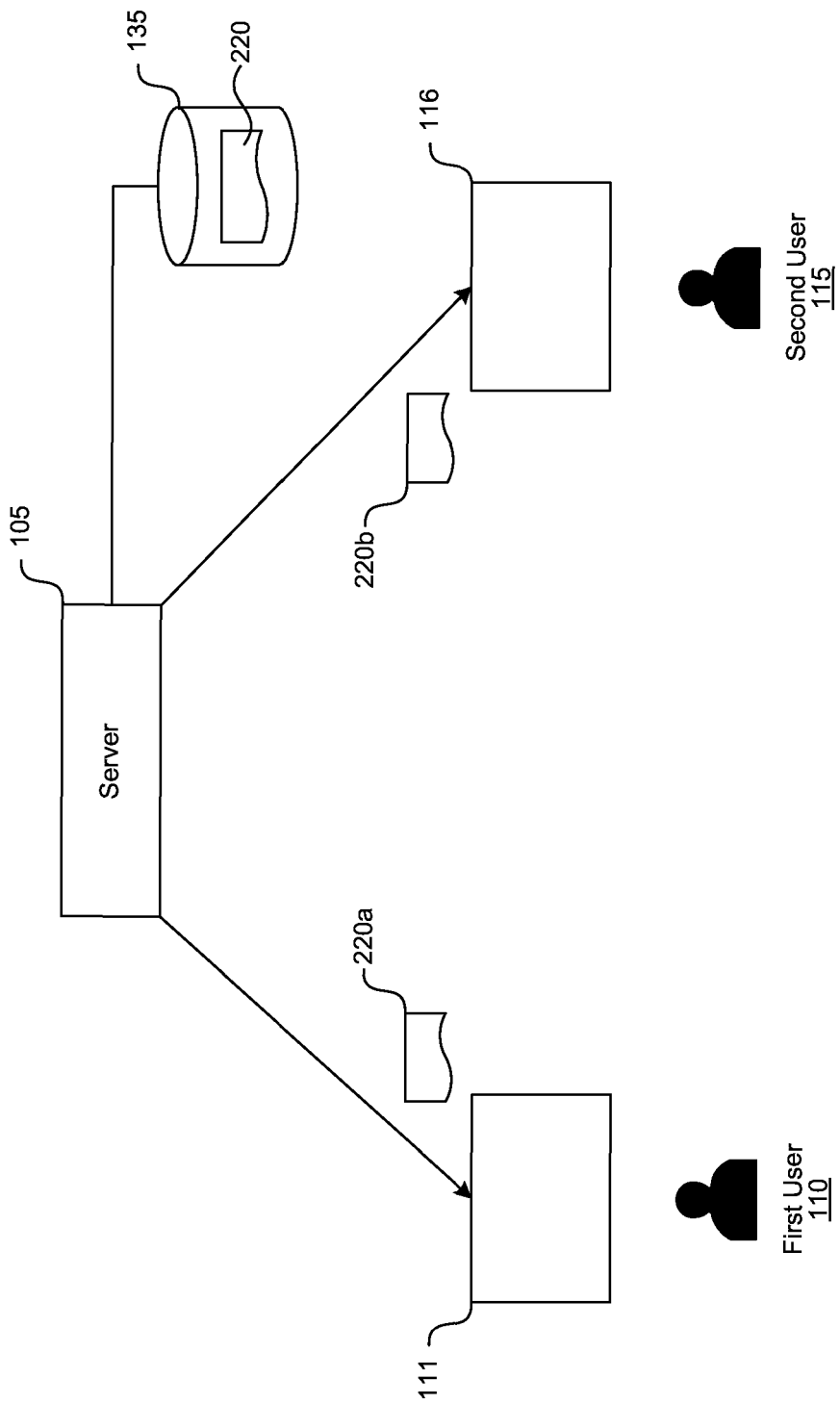
FIG. 2D is a block diagram for transmitting copies of a code dictionary object to each of the first user and the second user, consistent with various embodiments.

After the set of codes 215 are generated, the server 105 stores the set of codes 215 and the message portions to which they correspond in a code dictionary object 220 and sends out a copy of the code dictionary object 220, e.g., code dictionary object 220a and code dictionary object 220b, to each of the first user 110 and the second user 115, as illustrated in FIG. 2D. The first client 111 associated with the first user 110 receives the code dictionary object 220a and stores it in a storage device associated with first client 111. Similarly, the second client 116 associated with the second user 115 receives the code dictionary object 220b and stores it in a storage device associated with the second client 116.

The code dictionary object 220a and 220b sent to the pair of users—the first user 110 and the second user 115 contain codes that are unique for that pair of users. That is, the codes can be different for different pairs of users. For example, the codes for conversations between the first user 110 and the third user 120 or for conversations between the third user 120 and the fourth user 125 can be different from the set of codes 215. While the code for the word "Honey" is "0010" for conversations between the first user 110 and the second user 115, the code can be different for the same word in conversations between the first user 110 and the third user 120. In some embodiments, this is because the generation of codes depends on the combination of message portions occurring in the conversations between a pair of users.

The coding technique generates optimal codes for different message portions occurring in the conversations. Typically, in the coding techniques, the higher the frequency of the occurrence of the message portion, the more optimized is the corresponding code, e.g., consuming less storage space. A word which occurs more frequently in conversations between one pair of users may not occur that frequently in conversations between another pair of users. Accordingly, different codes can be generated for different pairs of users. The set of codes generated for each pair of users may be stored in a separate code dictionary.

In some embodiments, certain message portions may be common across a group of users. For example, if the users 110-125 are part of a team in an organization, or a family, or friends, or employees in an organization, certain message portions can be same across their conversations. So the server 105 can generate codes for these message portions that are common among the group of users, and share the common codes with the entire group of users. These codes can be added to the code dictionary object that is unique between a pair of users. For example, referring back to code dictionary object 220, which contains codes that are unique between the first user 110 and the second user 115, the codes that are generated for message portions common across conversations the group of users 110-125 can be added to the code dictionary object 220. In another example, a new code dictionary object that contains codes generated for message portions common across conversations the group of users 110-125 can be created. Further, the server 105 ensures that no separate codes are generated for a message portion that is common in conversations between the pair of users as well as between the users of the group.

Figure 3:
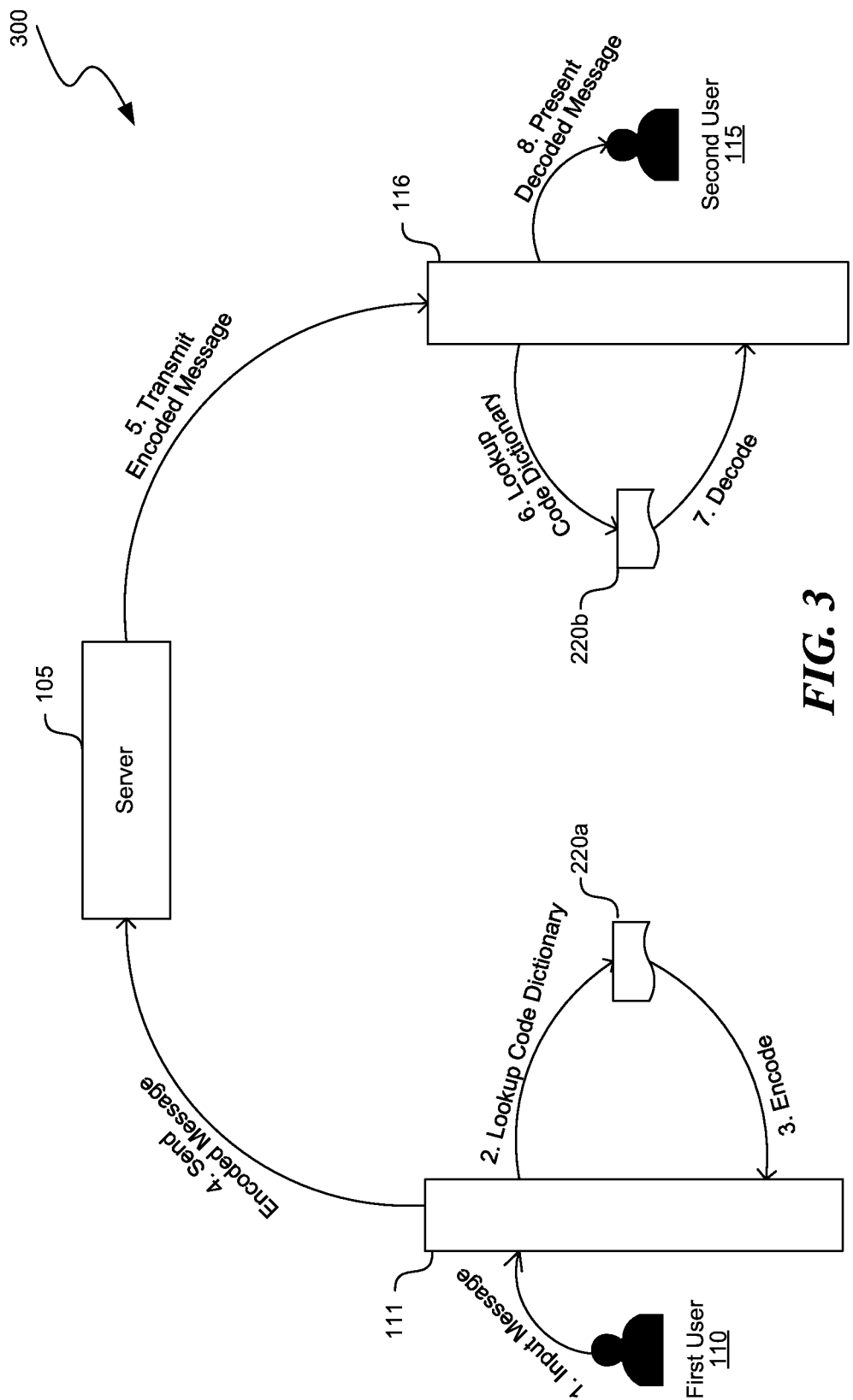
FIG. 3 is a block diagram of an example illustrating encoding and decoding messages by the users using the code dictionary object of FIGS. 2C and 2D, consistent with various embodiments.

FIG. 3 is a block diagram of an example 300 illustrating encoding and decoding messages by the users using the code dictionary object of FIGS. 2C and 2D, consistent with various embodiments. The first client 111 associated with the first user 110 encodes and/or decodes a message that is sent to and/or received from the second user 115 using the code dictionary object 220a received from the server 105. Similarly, the second client 116 associated with the second user 115 encodes and/or decodes a message that is sent to and/or received from the second user 115 using the code dictionary object 220b received from the server 105.

In the example 300, the first user 110 sends a message to the second user 115. After the first user 110 inputs the message at the first client 111 and sends the message to the second user 115, the first client 111 analyzes the message to determine if there any message portions that match with the message portions contained in the code dictionary object 220a, encodes the matching message portions, prior to transmitting the message, with their corresponding codes to generate an encoded message, and then sends the encoded message to the server 105 for transmission to the second user 115. Note that the message portions which do not match with the message portions in the code dictionary object 220a are sent without being encoded, e.g., as is.

When the second user 115 receives the message, the second client 116 analyzes the received message to determine if there are any codes in the message, and if there are any codes, it performs a lookup in the code dictionary object 220b to retrieve the message portions to which the codes correspond, decodes the message by replacing the codes with the corresponding message portions, and presents the decoded message to the second user 115, e.g., outputs the decoded message on a display of the second client 116.

In some embodiments, as described at least with reference to FIG. 2C the server 105 stores the messages exchanged between the first user 110 and the second user 115 in a log, e.g., log 205. The log 205 is used for various purposes. For example, the server 105 analyzes the log 205 to monitor the new messages exchanged between the first user 110 and the second user 115 to determine whether there are any new message portions that satisfy the encoding criteria. In some embodiments, the server 105 analyzes the log 205 based on a specified schedule or a trigger. The server 105 generates new codes for new message portions, optimizes the codes for the previously identified message portions by generating different codes, etc.

For example, the nature of conversations between the pair of users can change, e.g., with time, occasion, circumstances. So as the nature of the conversations change, the message portions that are commonly exchanged between the users can change. So a word, e.g., "honey," which was occurring more frequently over prior conversations can be occurring less frequently in the more recent conversations; instead the word "money" can be occurring more frequently in the more recent conversations. So the server 105 can generate more optimal code for "money" and less optimal code for "honey." The server 105 typically reserves more optimal codes for message portions that occur more frequently and/or have a higher probability of occurrence than the message portions that occur less frequently or have a lower probability of occurrence. Accordingly, the server 105 can update the set of codes in the code dictionary object 220, e.g., to generate new codes for new message portions, to update/modify codes of previously identified message portions.

When the server 105 updates the code dictionary object 220, it generates a new version of the code dictionary object 220 and sends a copy of the new version of the code dictionary object 220 to the first user 110 and the second user 115 for storage at their associated clients 111 and 116. The clients 111 and 116 can overwrite previously stored version of the code dictionary object with a new version of the code dictionary object or store both of the versions. In some embodiments, the clients 111 and 116 store both of the versions; that way if the user wishes to see older messages that are encoded using an earlier version of the code dictionary object can use the earlier version of the code dictionary object to decode the older messages. In some embodiments, the messages exchanged between the users include version information of the code dictionary object using which the message is encoded.

Figure 4:
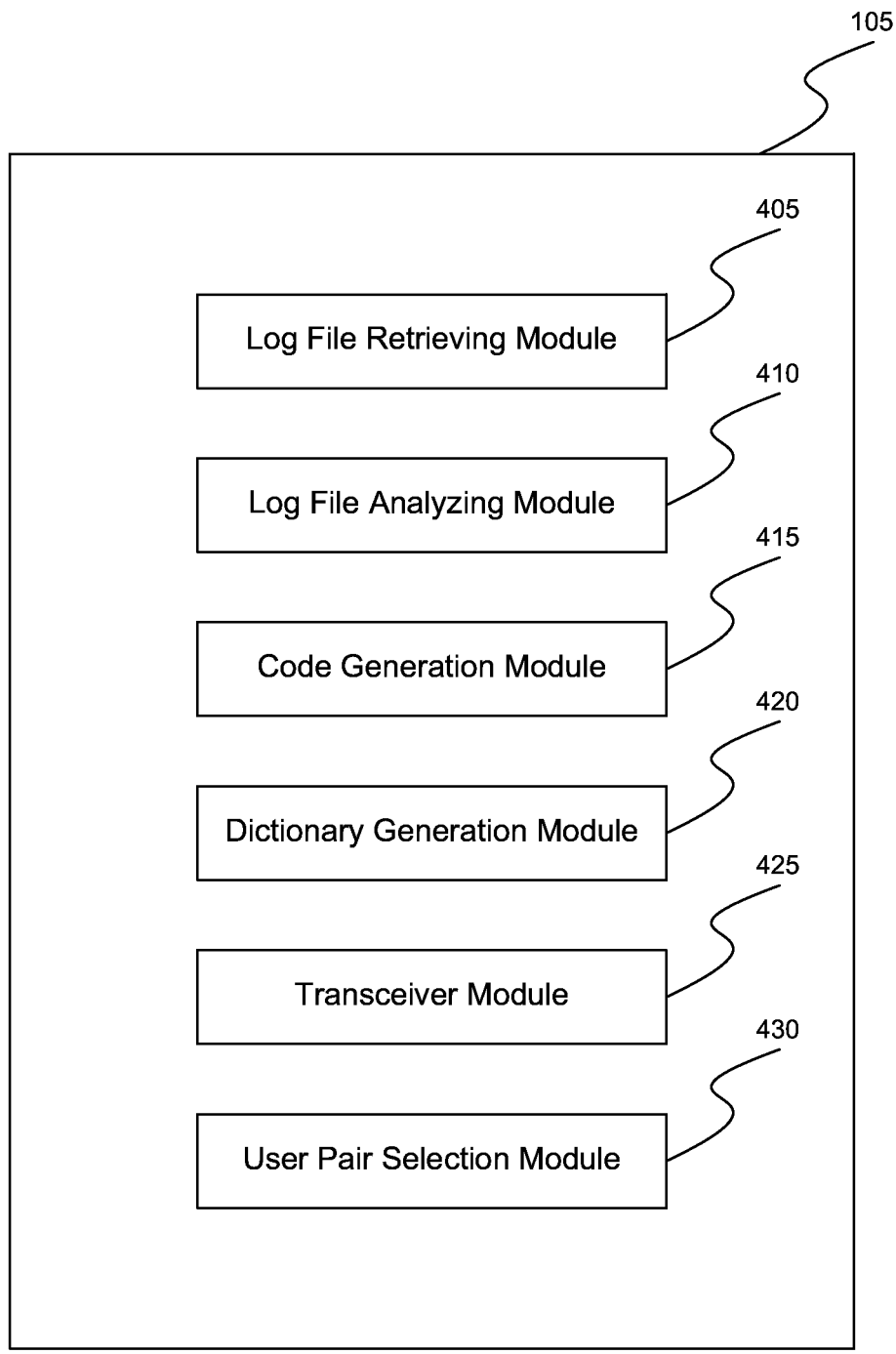
FIG. 4 is a block diagram of a server of FIG. 1, consistent with various embodiments.

FIG. 4 is a block diagram of the server 105, consistent with various embodiments. The server 105 includes various components using which the functions of the server 105 described at least with reference to FIGS. 1-3 may be realized. The server 105 includes a log file retrieving module 405 using which a log file, e.g., log 140, log 205, containing messages exchanged between users, e.g., a pair of users or a group of users, can be retrieved. The log file retrieving module 405 retrieves the log file from a storage system, e.g., storage system 135 associated with the server 105.

The server 105 includes a log file analyzing module 410 to identify message portions that satisfy encoding criteria, e.g., a frequency of occurrence, a probability of occurrence. For example, the log file analyzing module 410 identifies those message portions whose frequency of occurrence or a probability of occurrence exceeds a specified threshold. In some embodiments, a message portion is a word, a phrase, an emoticon, a sticker or a combination thereof in a message.

The log file analyzing module 410 can analyze the log file based on a specified schedule, e.g., at regular intervals, or based on a specified trigger, e.g., when a number of messages exchanged reaches as a specified threshold.

The server 105 includes a code generation module 415 to encode the message portions identified by the log file analyzing module 410. The code generation module 415 encodes the message portions based on a specified encoding technique, e.g., Huffman encoding. The code generation module 415 generates codes of variable-length or fixed length codes. One of the objectives of the code generation module 415 is to generate a code for a message portion that consumes lesser storage space and therefore, lesser network resource, than the message portion during transmission from the first user 110 to the second user 115.

The server 105 includes a dictionary generation module 420 that generates a code dictionary object, e.g., code dictionary object 220, to store the codes generated by the code generation module 415. The dictionary generation module 420 stores the codes by storing a mapping of the code to the message portion which the code corresponds.

The server 105 includes a transceiver module 425 that sends and/or receives various data, e.g., messages, code dictionary objects. The server 105 includes a user pair selection module 430 to identify a set of users with who a particular communicates so that the codes can be generated for message portions occurring in messages exchanged between the particular user and each of the set of users. The user pair selection module 430 notifies the log file retrieving module 405 regarding the set of users with who the particular user exchanges messages with. In some embodiments, the set of users can be a subset of contacts in a contact list of a messenger application or an address book of the particular user. The user pair selection module 430 selects some of the contacts as the set of users based on various criteria. In some embodiments, the user pair selection module 430 selects those users from the contact list with whom the particular user exchanges messages at a frequency that exceeds a specified threshold.

Additional details with respect to each of the modules in the server 105 are described at least with reference to FIG. 6 below.

Figure 5:
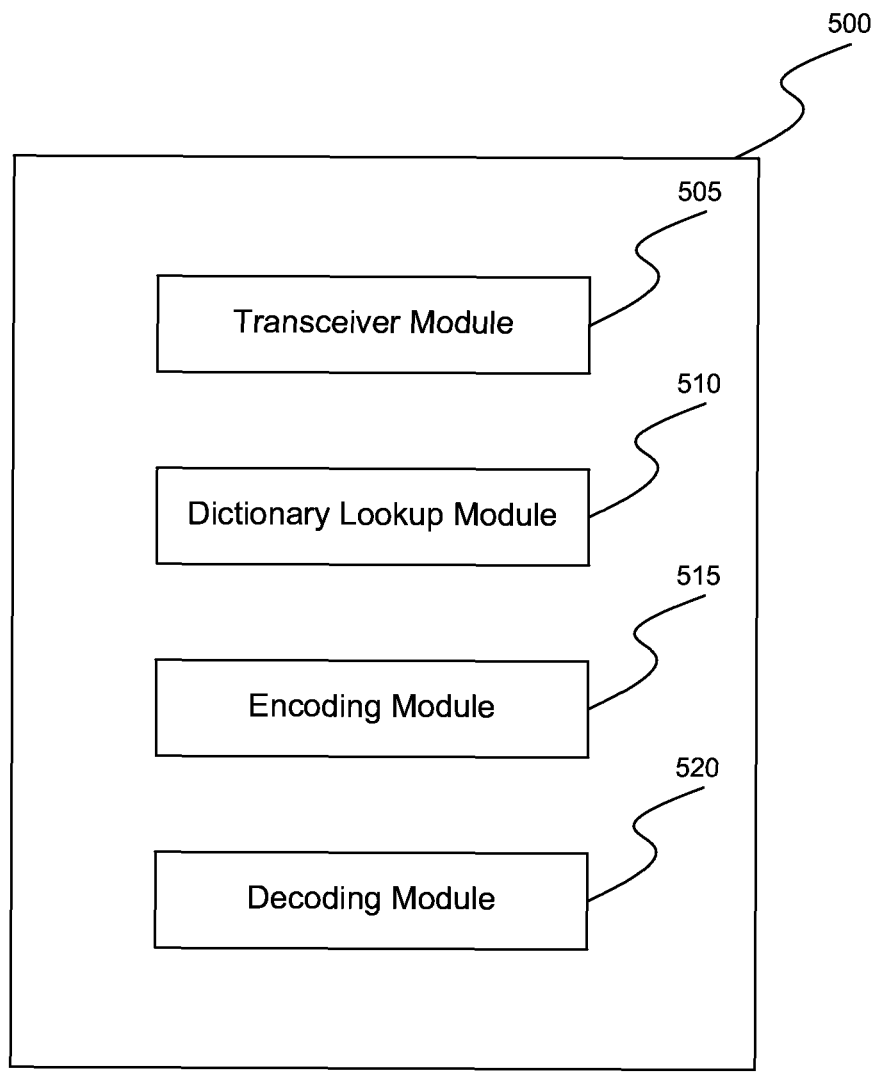
FIG. 5 is a block diagram of a computing device of FIG. 1, consistent with various embodiments.

FIG. 5 is a block diagram of a computing device 500, consistent with various embodiments. In some embodiments, the computing device 500 is similar to one or more of the clients 111-116 of FIG. 1. The clients 111-116 can include various modules of the computing device 500, which are described below. The computing device 500 includes a transceiver module 505 to send and/or receive various types of data, e.g., code dictionary objects from the server 105, messages from and/or to other users.

The computing device 500 includes a dictionary lookup module 510 to identify message portions of a message input by the user that are matching with the message portions in the code dictionary object to facilitate encoding of the message being transmitted. The computing device 500 includes an encoding module 515 that encodes the message portions identified by the dictionary lookup module 510 by replacing them with the codes from the code dictionary object, which correspond to the identified message portions.

The dictionary lookup module 510 also performs a lookup in the code dictionary object to retrieve the message portions from the code dictionary object that correspond to the codes in the encoded message received at the computing device 500 for facilitating decoding of the encoded message. The computing device 500 includes a decoding module 520 that decodes the codes in the received encoded message by replacing them with the message portions identified by the dictionary lookup module 510.

Figure 6:
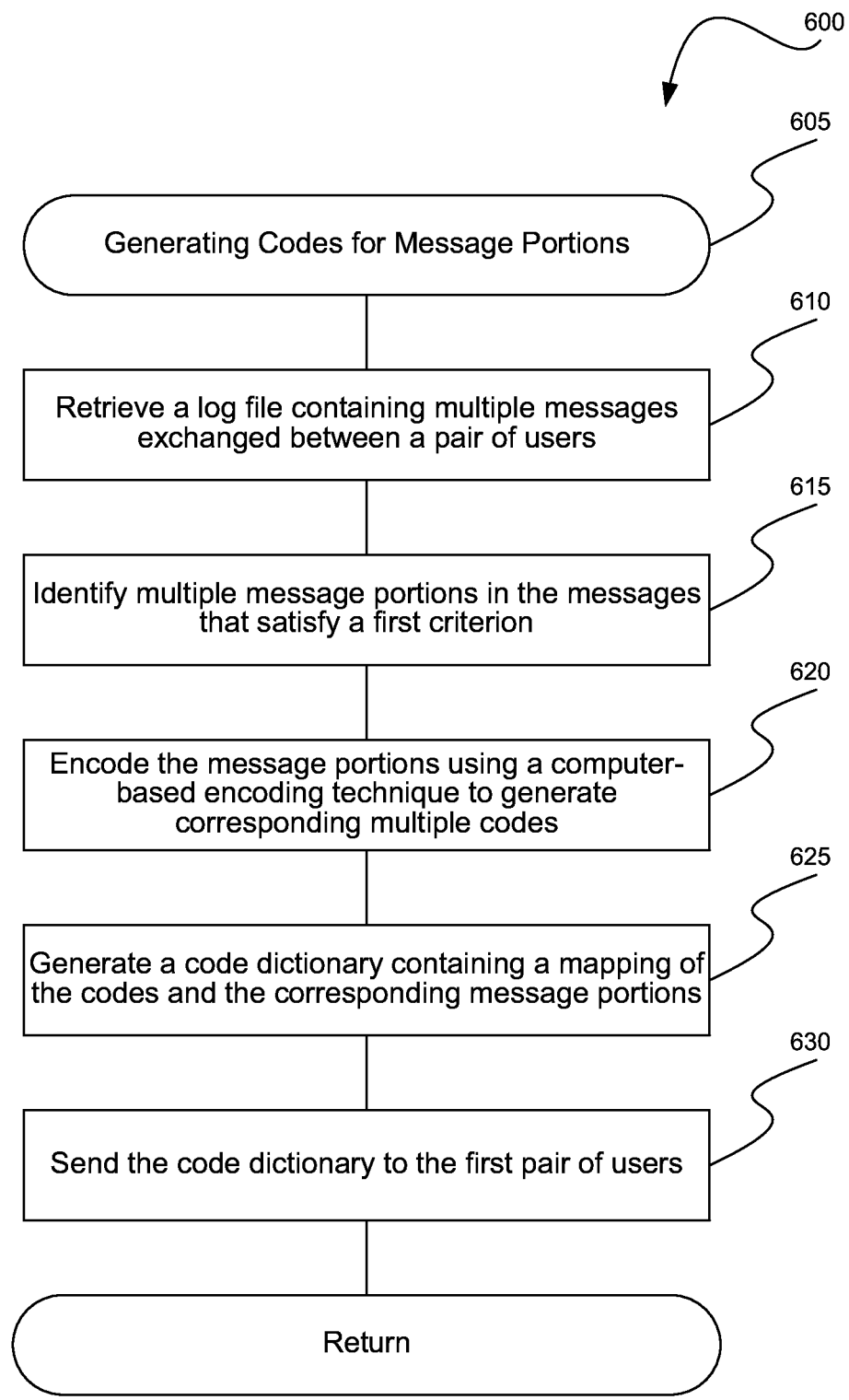
FIG. 6 is a flow diagram of a process for generating codes for message portions, consistent with various embodiments.

FIG. 6 is a flow diagram of a process 600 for generating codes for message portions, consistent with various embodiments. The process 600 may be executed in an environment 100 of FIG. 1. The process 600 begins at block 605, and at block 610, the log file retrieving module 405 of the server 105 retrieves a log file containing messages exchanged between a pair of users. For example, the log file retrieving module 405 retrieves the log 205 containing messages exchanged between the first user 110 and the second user 115 as illustrated in FIGS. 2A-2C. The messages can include a variety of multimedia content, e.g., text, audio clips, video clips, emoticons, stickers.

In some embodiments, the log file retrieving module 405 retrieves the log files of the pairs of users identified by the user pair selection module 430. In some embodiments, the users identified can be a subset of contacts in a contact list of a messenger application or an address book of the particular user. The user pair selection module 430 selects the users based on various criteria. In some embodiments, the user pair selection module 430 selects those users from the contact list with whom the particular user exchanges messages at a frequency that exceeds a specified threshold.

At block 615, the log file analyzing module 410 identifies the portions of the messages in the log file that satisfy encoding criteria, e.g., a frequency of occurrence, a probability of occurrence. In some embodiments, a message portion is a word, a phrase, an emoticon, a sticker or a combination thereof in a message. In some embodiments, the log file analyzing module 410 identifies those message portions whose frequency of occurrence and/or a probability of occurrence exceed a specified threshold. For example, in the log 205, as described at least with reference to FIGS. 2A-2D, the log file analyzing module 410 identifies the word "Honey" and the phrase "I love you" as frequently occurring message portions.

At block 620, the code generation module 415 generates codes for the message portions identified at block 615. The code generation module 415 generates the codes based on a specified coding technique, e.g., Huffman encoding. For example, the code generation module 415 generates codes "0010" for the word "Honey" and "001" for the phrase "I love you". In some embodiments, the code generation module generates more optimal codes, e.g., consuming lesser storage space, for more frequently occurring message portions than for the less frequently occurring message portions. The codes can be of fixed-length, e.g., the codes generated for each of the message portions have same number of bits, or can be of variable-length.

At block 625, the dictionary generation module 420 generates a code dictionary to store the codes. For example, the dictionary generation module 420 generates a code dictionary object 220. The code dictionary object also stores a mapping of the codes to the corresponding message portions.

At block 630, the transceiver module 425 transmits a copy of the code dictionary object to each of the pair of users, and the process 600 returns. For example, the code dictionary object 220 is transmitted as the code dictionary object 220a to the first user 110 and as the code dictionary object 220b to the second user 115. The first user 110 and the second user 115 can use the code dictionary object to encode and/or decode the messages exchanged between them. In some embodiments, the code dictionary object itself may be compressed and transmitted.

In some embodiments, at least a portion of the process 600, e.g., the generation of codes and code dictionaries, can be performed by one or more of computing devices 111-126. For example, for the conversation between the first user 110 and the second user 115, one of the two clients, e.g., the first client 111 or the second client 116, can generate the codes and the code dictionary object and transmit the code dictionary object to the other of the two clients. Any number of mechanisms can be used to determine which client generates the codes and the code dictionary, e.g., the first client 111 checks with the second client 116 to determine if the second client 116 has created them and if not, the first client 111 can generate them. The clients can retrieve the log containing the history of messages exchanged between the first user 110 and the second user 115 from the server 105 for generating the codes.

Figure 7:
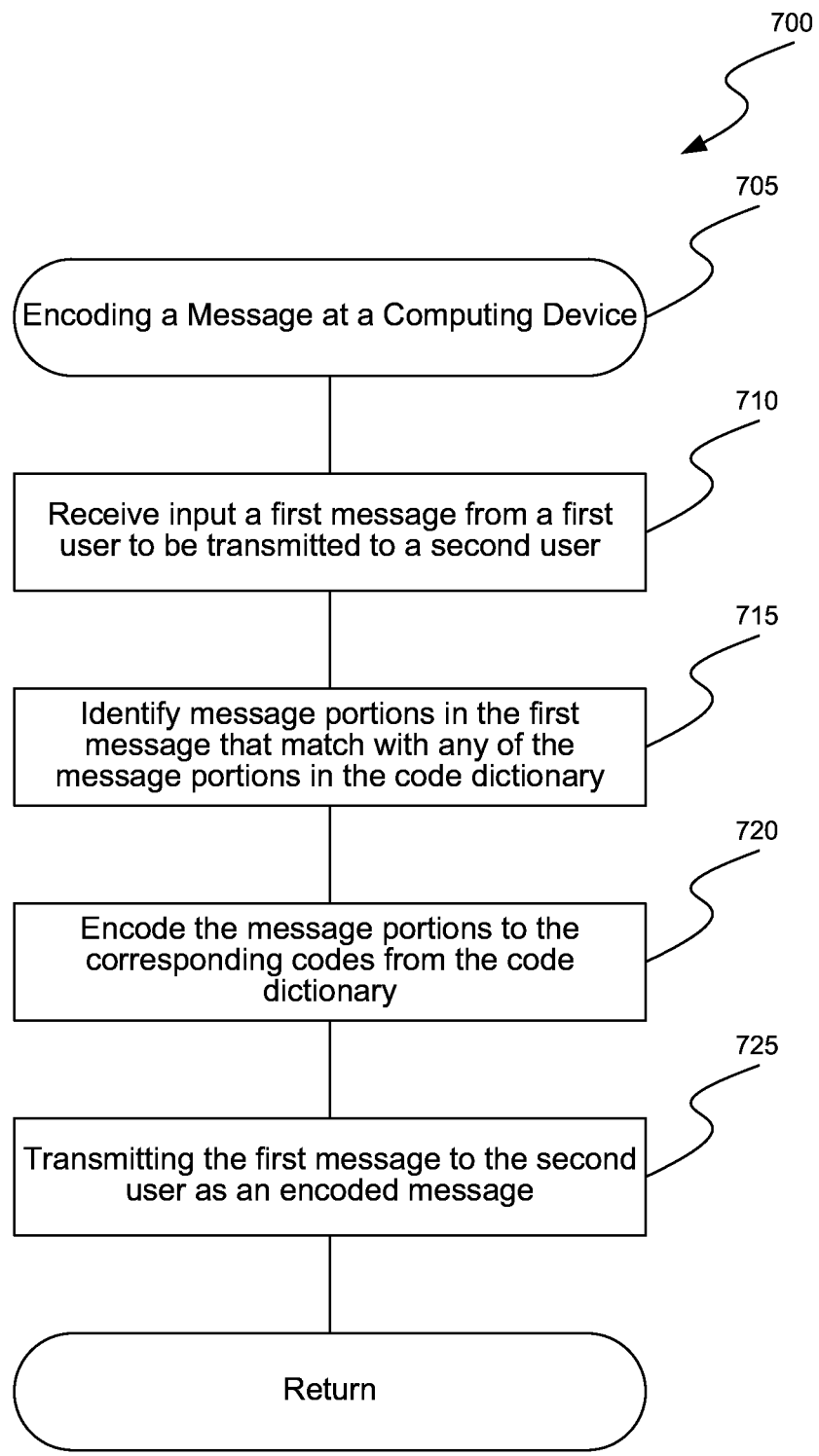
FIG. 7 is a flow diagram of a process for encoding a message by a sender for transmission to a receiver, consistent with various embodiments.

FIG. 7 is a flow diagram of a process 700 for encoding a message by a sender for transmission to a receiver, consistent with various embodiments. The process 700 may be executed in an environment 100 of FIG. 1 and by any of the computing devices 111-126. In some embodiments, the computing devices 111-126 are similar to the computing device 500 of FIG. 5. The process 700 beings at block 705, and at block 710, the computing device 500 receives a message that is input by the sender for transmission of the message to a receiver. For example, the first user 110 can input a message at the first client 111 to be transmitted to the second user 115. The message can include various multimedia content, e.g., text, audio, video, emoticons, stickers.

At block 715, the dictionary lookup module 510 determines if any of the portions of the message matches with any of the message portions in the code dictionary object stored at the computing device. For example, with reference to FIGS. 2A-2D, the dictionary lookup module 510 performs a look up in the code dictionary object 220a and determines the portions in the message input by the first user 110 that match with the message portions stored in the code dictionary object 220a.

At block 720, the encoding module 515 encodes the matching message portions by replacing the matching message portions with the codes that correspond to the matching message portions. For example, the encoding module 515 of the first client 111 uses the mapping stored in the code dictionary object 220a to obtain the codes that correspond to matching message portions, and replaces the matching message portions with their corresponding codes to generate an encoded message. In some embodiments, the message portions that do match are sent without being encoded, e.g., as is.

At block 725, the transceiver module 505 sends the encoded message to the server 105 to be transmitted to the receiver, and the process 700 returns. For example, the transceiver module 505 of the first client 111 sends the encoded message to the server 105 to be transmitted to the second user 115.

Figure 8:
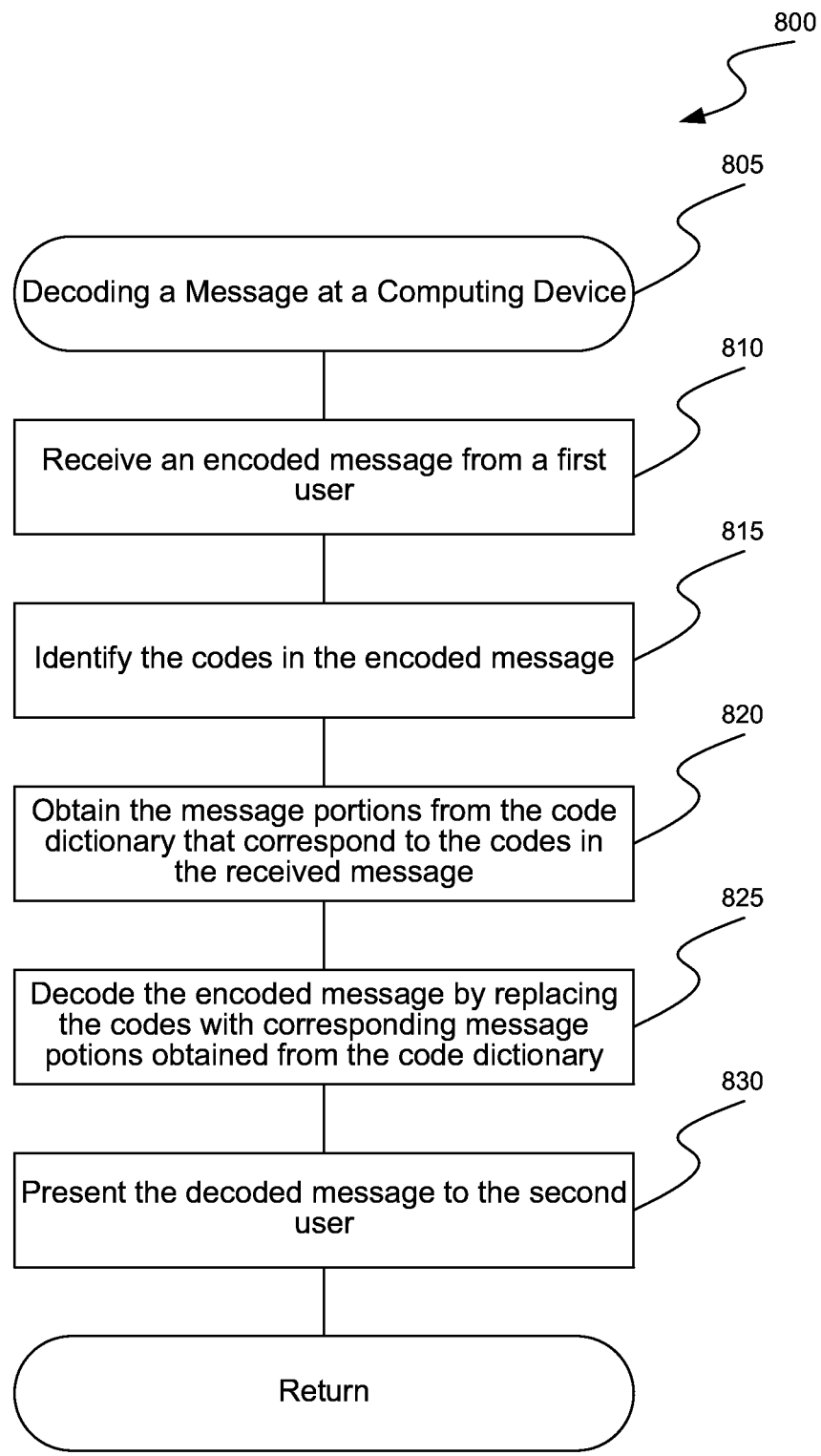
FIG. 8 is a flow diagram of a process for decoding an encoded message received from a sender, consistent with various embodiments.

FIG. 8 is a flow diagram of a process 800 for decoding an encoded message received from a sender, consistent with various embodiments. The process 800 may be executed in the environment 100 of FIG. 1 and by any of the computing devices 111-126. In some embodiments, the computing devices 111-126 are similar to the computing device 500 of FIG. 5. The process 800 beings at block 805, and at block 810, the transceiver module 505 receives an encoded message from the server 105 that is sent from a sender. For example, as described with reference to FIG. 3, the second client 116 receives the message sent from the first user 110 to the second user 115. In some embodiments, at least a portion of the message is encoded by the sender.

At block 815, the dictionary lookup module 510 identifies the codes in the received encoded message and, at block 820, retrieves the message portions to which the codes correspond from the code dictionary object stored at the computing device of the receiver. For example, the second client 116 identifies the codes in the received encoded message and retrieves the message portions to which the codes correspond from the code dictionary object 220b stored at the second client 116.

At block 825, the decoding module 520 decodes the received message by replacing the codes with corresponding message portions retrieved from the code dictionary object. For example, the second client 116 replaces the codes in the received encoded message with the retrieved message portions.

At block 830, the decoding module 520 presents the decoded message to the user, e.g., output the message on a display of the computing device, and the process 800 returns. For example, the second client 116 presents the decoded message to the second user 115, e.g., by presenting the message on a display of the second client 116.

Figure 9:
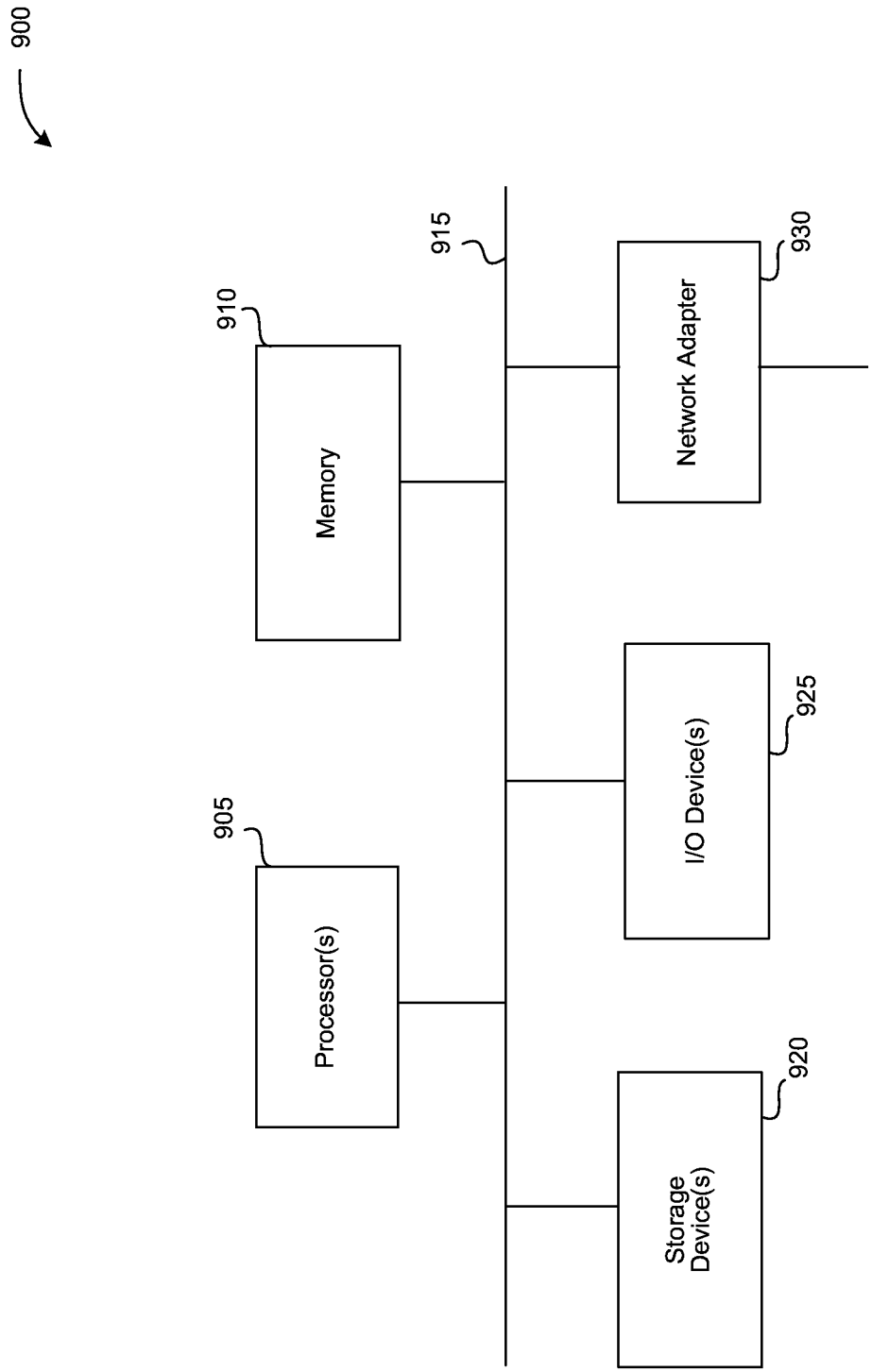
FIG. 9 is a block diagram of a computer system as may be used to implement features of some embodiments.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method performed by a computing system, comprising:
   identifying multiple messages exchanged between a first pair of users;
   identifying multiple message portions in the messages that satisfy a first criterion;
   encoding the message portions using a computer-based encoding technique to generate corresponding multiple codes, the codes consuming less storage space than the message portions to which the codes correspond, wherein the encoding includes:
      determining that a first message portion of the message portions has occurred a specified number of times,
      determining, due to the occurrence of the first message portion, that a second message portion is likely to occur with a specified probability in the future, and
      generating a first code for the first message portion and a second code for the second message portion, wherein generating the first code includes generating a set of codes for multiple variations of the first message portion, wherein a first variation of the multiple variations of the first message portion includes the first message portion and an additional message portion;
   generating a code dictionary containing a mapping of the codes and the corresponding message portions;
   sending the code dictionary to the first pair of users, wherein the code dictionary has multiple versions, wherein a specified version of the multiple versions is to be used by the first pair of users to encode and/or decode a set of messages to be exchanged based on version information associated with the set of messages;
   receiving a request by a first user of the first pair of users to retrieve a specified set of messages sent or received by the first user;
   sending the specified set of messages to a computing device associated with the first user, wherein the specified set of messages includes a first subset of messages exchanged in a first period and a second subset of messages exchanged in a second period after the first period, wherein the first subset of messages are encoded using a first version of the multiple versions and the second subset of messages are encoded using a second version of the multiple versions; and
   causing the computing device to decode the first subset of messages using the first version and decode the second subset of messages using the second version prior to presenting the specified set of messages to the first user, wherein both the first version and the second version of code dictionary are stored at the computing device.

2. The method of claim 1, wherein a message portion of the message portions includes at least one of a word or a phrase in a message of the messages.

3. The method of claim 1 further comprising:
   receiving from the first user a first message to be transmitted to a second user of the first pair of users, the first message including a specified code of the multiple codes.

4. The method of claim 3, wherein receiving the first message with the specified code includes:
   causing the computing device to replace, prior to transmitting the first message to the computing system, a first message portion in the first message with the specified code, wherein the first message portion matches with a specified message portion of the message portions to which the specified code corresponds.

5. The method of claim 4, wherein causing the computing device to replace the first message portion with the specified code includes causing the computing device to:
   determine whether the first message portion matches with any of the message portions in the code dictionary,
   confirm that the first message portion matches with the specified message portion, and
   replace the first message portion with the specified code.

6. The method of claim 1 further comprising:
   transmitting a first message received from the first user to a second user of the first pair of users, the first message including a specified code of the codes.

7. The method of claim 6 further comprising:
   causing a computing device associated with the second user to:
   receive the first message,
   replace the specified code in the first message with a specified message portion to which the specified code corresponds, and
   present the first message to the second user after replacing the specified code with the specified message portion.

8. The method of claim 7, wherein causing the computing device to replace the specified code with the specified message portion includes causing the computing device to:

perform a lookup in the code dictionary to retrieve the specified message portion to which the specified code corresponds, and replace the specified code with the specified message portion.

9. The method of claim 1, wherein the first criterion includes at least one of a specified frequency of occurrence of the message portions or a specified probability of occurrence of the message portions.

10. The method of claim 1, wherein the codes stored in the code dictionary are unique for the first pair of users, the first pair of users being one of a multiple pairs of users.

11. The method of claim 1, wherein the code dictionary is configured to store, in addition to the codes for the message portions that occur in the messages exchanged between the first pair of users, a set of codes for a set of message portions that occur in a set of messages exchanged between one of the first pair of users and another user.

12. The method of claim 1 further comprising:
receiving a second set of messages exchanged between the first pair of users;
encoding a set of message portions in the second set of messages using the computer-based encoding technique to generate a set of codes, the set of message portions satisfying the first criterion;
updating the code dictionary with the set of codes to generate a third version of the code dictionary; and
sending the third version of the code dictionary to the first pair of users.

13. The method of claim 1, wherein identifying the messages includes:
retrieving a log file containing the messages exchanged between the first pair of users,
retrieving user information of multiple users from an address book of the first user,
selecting, based on a second criterion, a subset of the users with who the first user exchanges a set of messages, and
retrieving a set of log files for the subset of the users, the set of log files containing the set of messages exchanged between the first user and the subset of the users.

14. The method of claim 1, wherein the computer-based encoding technique includes Huffman coding technique.

15. The method of claim 1, wherein the codes are variable bit-length codes or fixed bit-length codes.

16. A non-transitory computer-readable storage medium storing computer-readable instructions, comprising:
instructions for receiving, at a computing device and from a first user of a first pair of users, an input of a first message to be transmitted to a second user of the first pair of users;
instructions for identifying, at the computing device, a first message portion in the first message that match with any of multiple reference message portions stored in a code dictionary at the computing device, wherein the code dictionary is obtained from a server computing device that facilitates exchanging of the first message between the first user and the second user, wherein the code dictionary has multiple versions, wherein a specified version of the multiple versions is to be used by the first pair of users to encode and/or decode a set of messages to be exchanged based on version information associated with the set of messages;
instructions for encoding, at the computing device, the first message portion in the first message to a specified code from the code dictionary to generate an encoded message, the specified code corresponding to a specified message portion of the message portions stored in the code dictionary that matches with the first message portion, wherein the instructions for encoding include:
instructions for determining that the first message portion has occurred a specified number of times,
instructions for determining, due to the occurrence of the first message portion, that a second message portion is likely to occur with a specified probability in the future, and
instructions for generating the specified code for the first message portion and a second code for the second message portion, wherein generating the specified code includes generating a set of codes for multiple variations of the first message portion, wherein a first variation of the multiple variations of the first message portion includes the first message portion and an additional message portion;
instructions for transmitting the encoded message to the server computing device;
instructions for retrieving, from the server computing device, a specified set of messages sent or received by the first user, wherein the specified set of messages includes a first subset of messages exchanged in a first period and a second subset of messages exchanged in a second period after the first period, wherein the first subset of messages are encoded using a first version of the multiple versions and the second subset of messages are encoded using a second version of the multiple versions; and
instructions for decoding the first subset of messages using the first version and decode the second subset of messages using the second version prior to presenting the set of messages to the first user, wherein both the first version and the second version of the code dictionary are stored at the computing device.

17. The non-transitory computer-readable storage medium of claim 16 further comprising:
instructions for receiving, at the computing device, a second encoded message originating from the second user, the second encoded message including a second code;
instructions for retrieving, at the computing device, a second message portion from the code dictionary at the computing device, that corresponds to the second code; and
instructions for replacing, at the computing device, the second code in the second encoded message with the second message portion to generate a second message.

18. The non-transitory computer-readable storage medium of claim 16, wherein the code dictionary is generated by the server computer, the server computer generating the code dictionary by:
identifying, in multiple messages exchanged between the first pair of users, multiple message portions that satisfy a first criterion,
encoding the message portions using a computer-based encoding technique to generate corresponding multiple codes, and
storing the codes in the code dictionary.

19. A system, comprising:
a processor;
a first module to receive a first message originating from a first computing device associated with a first user, the first message being encoded to include a first code, wherein the first message is encoded by:
determining that a first message portion of the first message has occurred a specified number of times, determining, due to the occurrence of the first message portion, that a second message portion is likely to occur with a specified probability in the future, and generating the first code for the first message portion and a second code for the second message portion, wherein generating the first code includes generating a set of codes for multiple variations of the first message portion, wherein a first variation of the multiple variations of the first message portion includes the first message portion and an additional message portion;

a second module to retrieve the first message portion corresponding to the first code from a code dictionary, the code dictionary provided by a server computing device that facilitates exchanging of the first message between the first user and a second user associated with the system, wherein the first code is generated by the first computing device by encoding a message portion that match any of multiple reference message portions stored in the code dictionary, wherein the code dictionary has multiple versions, wherein a specified version of the multiple versions is to be used by the first user and the second user to encode and/or decode a set of messages to be exchanged based on version information associated with the set of messages; and a third module to replace the first code in the first message with the first message portion to generate a decoded message, wherein the first module is further configured to retrieve, from the server computing device, a specified set of messages sent or received by the first user, wherein the specified set of messages includes a first subset of messages exchanged in a first period and a second subset of messages exchanged in a second period after the first period, wherein the first subset of messages are encoded using a first version of the multiple versions and the second subset of messages are encoded using a second version of the multiple versions, and wherein second module is further configured to decode the first subset of messages using the first version and the second subset of messages using the second version, wherein both the first version and the second version of code dictionary are stored at the first computing device.

20. The system of claim 19, wherein the code dictionary is configured to store multiple codes for corresponding multiple message portions that occur in a plurality of messages exchanged between the first user and the second user.

* * * * *